(12) United States Patent
Kim et al.

(10) Patent No.: US 7,951,489 B2
(45) Date of Patent: May 31, 2011

(54) ANODE ACTIVE MATERIAL, METHOD OF PREPARING THE SAME, AND ANODE AND LITHIUM BATTERY EMPLOYING THE SAME

(75) Inventors: Gue-sung Kim, Yongin-si (KR);
Young-min Choi, Osan-si (KR); Han-su Kim, Gwanak-gu (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1111 days.

(21) Appl. No.: 11/341,997

(22) Filed: Jan. 27, 2006

(65) Prior Publication Data

US 2006/0216606 A1    Sep. 28, 2006

(30) Foreign Application Priority Data

Jan. 28, 2005  (KR) .................. 10-2005-0008002
Sep. 22, 2005  (KR) .................. 10-2005-0088324

(51) Int. Cl.
*H01M 4/58* (2010.01)
*H01M 4/34* (2010.01)
*H01M 4/00* (2010.01)
*H01M 4/42* (2010.01)

(52) U.S. Cl. ...... 429/219; 429/220; 429/229; 429/218.1

(58) Field of Classification Search ............... 429/218.1, 429/219, 220, 229
See application file for complete search history.

(56) References Cited

U.S. PATENT DOCUMENTS

| 4,324,680 | A | * | 4/1982 | Kubota et al. ............. 252/182.1 |
| 5,482,797 | A | | 1/1996 | Yamada et al. |
| 6,090,505 | A | * | 7/2000 | Shimamura et al. ....... 429/218.1 |
| 6,541,156 | B1 | * | 4/2003 | Fuse et al. ................. 429/218.1 |
| 7,074,521 | B2 | | 7/2006 | Sheem et al. |
| 2002/0164479 | A1 | * | 11/2002 | Matsubara et al. ........... 428/367 |
| 2003/0129494 | A1 | * | 7/2003 | Kaneda et al. ............. 429/231.1 |

FOREIGN PATENT DOCUMENTS

| JP | 10-149830 | 6/1998 |
| JP | 11-250896 | 9/1999 |
| JP | 2000-36323 | 2/2000 |
| JP | 2000-173612 | 6/2000 |
| JP | 2000-285919 | 10/2000 |

(Continued)

OTHER PUBLICATIONS

Korean Patent Abstracts, Publication No. 1020030028241 A; Publication Date: Apr. 8, 2003; in the name of Sang Jin Kim, et al.
Office Action dated Apr. 27, 2007 for corresponding Korean Patent Application No. 10-2005-0088324.

(Continued)

*Primary Examiner* — Helen O Conley
(74) *Attorney, Agent, or Firm* — Christie, Parker & Hale, LLP

(57) ABSTRACT

An anode active material including a metal core and a coating layer formed on a surface of the metal core is provided. The coating layer includes a conductive metal material. The coating layer covering the metal core is carbon-based and includes a conductive metal material. The anode active material has good electron conductivity and elasticity, thereby enhancing charge/discharge capacity and reducing the stress caused by expansion of the carbon-based coating layer and the metal core during charge/discharge cycles. Direct contact between the metal core and the electrolyte solution is remarkably reduced. In addition, anodes and lithium batteries including the anode active material exhibit excellent charge/discharge characteristics, such as discharge capacity and initial charge/discharge efficiency.

11 Claims, 4 Drawing Sheets

FOREIGN PATENT DOCUMENTS

| | | | |
|---|---|---|---|
| JP | 2002-216751 | * | 2/2002 |
| JP | 2004-200001 | | 7/2004 |
| JP | 2004-296161 | | 10/2004 |
| KR | 2000-0056985 | | 9/2000 |
| KR | 2003-0028241 | | 4/2003 |
| WO | WO 2005/036690 A1 | | 4/2005 |

OTHER PUBLICATIONS

Office Action for corresponding Korean Patent Application No. 10-2005-0088324 dated Oct. 9, 2006.

Korean Patent Abstracts, Publication No. 1020000056985 A; Publication Date: Sep. 15, 2000; in the name of Kim, et al.

Korean Patent Abstracts, Publication No. 1020030028241 A; Publication Date: Apr. 8, 2003; in the name of Kim, et al.

Chinese Office action dated Nov. 2, 2007, for corresponding Chinese application 200610006053X, with English translation indicating relevance of cited reference U.S. Patent 5,482,797.

Office action dated Sep. 1, 2009 for corresponding Japanese Patent Application No. 2006-017988 listing the cited references.

* cited by examiner

ANODE ACTIVE MATERIAL, METHOD OF PREPARING THE SAME, AND ANODE AND LITHIUM BATTERY EMPLOYING THE SAME

CROSS-REFERENCE TO RELATED PATENT APPLICATIONS

This application claims priority to and the benefit of Korean Patent Application No. 10-2005-0008002, filed on Jan. 28, 2005 in the Korean Intellectual Property Office and Korean Patent Application No. 10-2005-0088324, filed on Sep. 22, 2005 in the Korean Intellectual Property Office, the entire contents of which are incorporated herein by reference.

FIELD OF THE INVENTION

The present invention relates to an anode active material, a method of preparing the same, and anodes and lithium batteries employing the same. More particularly, the present invention relates to an anode active material which has excellent initial charge/discharge efficiency and discharge capacity.

BACKGROUND OF THE INVENTION

Non-aqueous electrolyte secondary batteries employing lithium compounds as anode materials have high voltages and high energy densities, and have therefore been actively studied. In particular, when interest in lithium as an anode material was developing, lithium metals with large capacities were studied. However, in lithium metal anodes, lithium dendrites grow on the lithium surface during charging. Therefore, charge/discharge efficiency decreases and short circuits between the anode and cathode may occur. Furthermore, lithium metal anodes are instable due to the high reactivity of lithium.

On the other hand, the expansion and contraction during charge/discharge cycles of anodes made of carbonaceous materials is less than that of anodes made of lithium or lithium alloys. However, carbonaceous anode materials have reduced capacity (about 350 mAh/g) and reduced initial charge/discharge efficiency relative to lithium anode materials. Thus, despite the disadvantages of metal anodes, attempts have been ongoing to enhance battery capacity of metal anodes such as lithium.

It is known that lithium metals and lithium alloys such as lithium-aluminum, lithium-lead, lithium-tin, and lithium-silicon can provide larger electric capacities (2,000 mAh/g or more) than carbonaceous materials. However, when lithium metals or lithium alloys are used alone, lithium dendrite formation and rapid volume change can occur. Thus, appropriate combinations of lithium metals or lithium alloys with carbonaceous materials as anode materials have been studied to increase electric capacity and prevent short circuits between the anode and cathode.

Various conventional techniques using such composite anode materials have been suggested. However, these techniques are based on coating metal particulate surfaces with carbon particles, etc. to prevent lithium dendrite formation, which occurs with metal materials, and to enhance charge/discharge capacities, which are lower with carbonaceous materials.

The carbonaceous materials used in these conventional techniques have low electric capacity and conductivity, thereby restricting the enhancements in initial charge/discharge efficiency and discharge capacity. Therefore, a more practical anode active material having good initial charge/discharge efficiency and high discharge capacity is needed.

SUMMARY OF THE INVENTION

In one embodiment of the present invention, an anode active material has enhanced initial charge/discharge efficiency and discharge capacity.

In another embodiment of the present invention, an anode includes the anode active material.

In yet another embodiment of the present invention, a lithium battery includes an anode having the anode active material.

In still another embodiment of the present invention, a method of preparing the anode active material is provided.

According to one embodiment of the present invention, an anode active material includes a metal core and a coating layer formed on a surface of the metal core. The coating layer includes a conductive metal material.

The conductive metal material of the coating layer may be present on the surface of the metal core. The conductive metal material may also be contained in the metal core.

The conductive metal material may be present in the anode active material in an amount ranging from about 0.1 to about 20 wt % based on the total weight of the anode active material.

The conductive metal material may have a resistivity of $5.5 \times 10^{-8}$ $\Omega$m or less and a coefficient of elasticity of 200 GPa or less. In another embodiment, the conducive metal material has a resistivity ranging from about $1.4 \times 10^{-8}$ $\Omega$m to about $5.5 \times 10^{-8}$ $\Omega$m and a coefficient of elasticity ranging from about 40 GPa to about 200 GPa.

According to another embodiment of the present invention, an anode includes the anode active material.

According to yet another embodiment of the present invention, a lithium battery employs the anode.

According to still another embodiment of the present invention, a method for preparing an anode active material includes: adding a polymeric material and a conductive metal material to a solvent to form a solution; stirring the solution; adding metal particles to the solution; stirring and drying the solution; and sintering the dried product to form a coating layer.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

Figure 1:
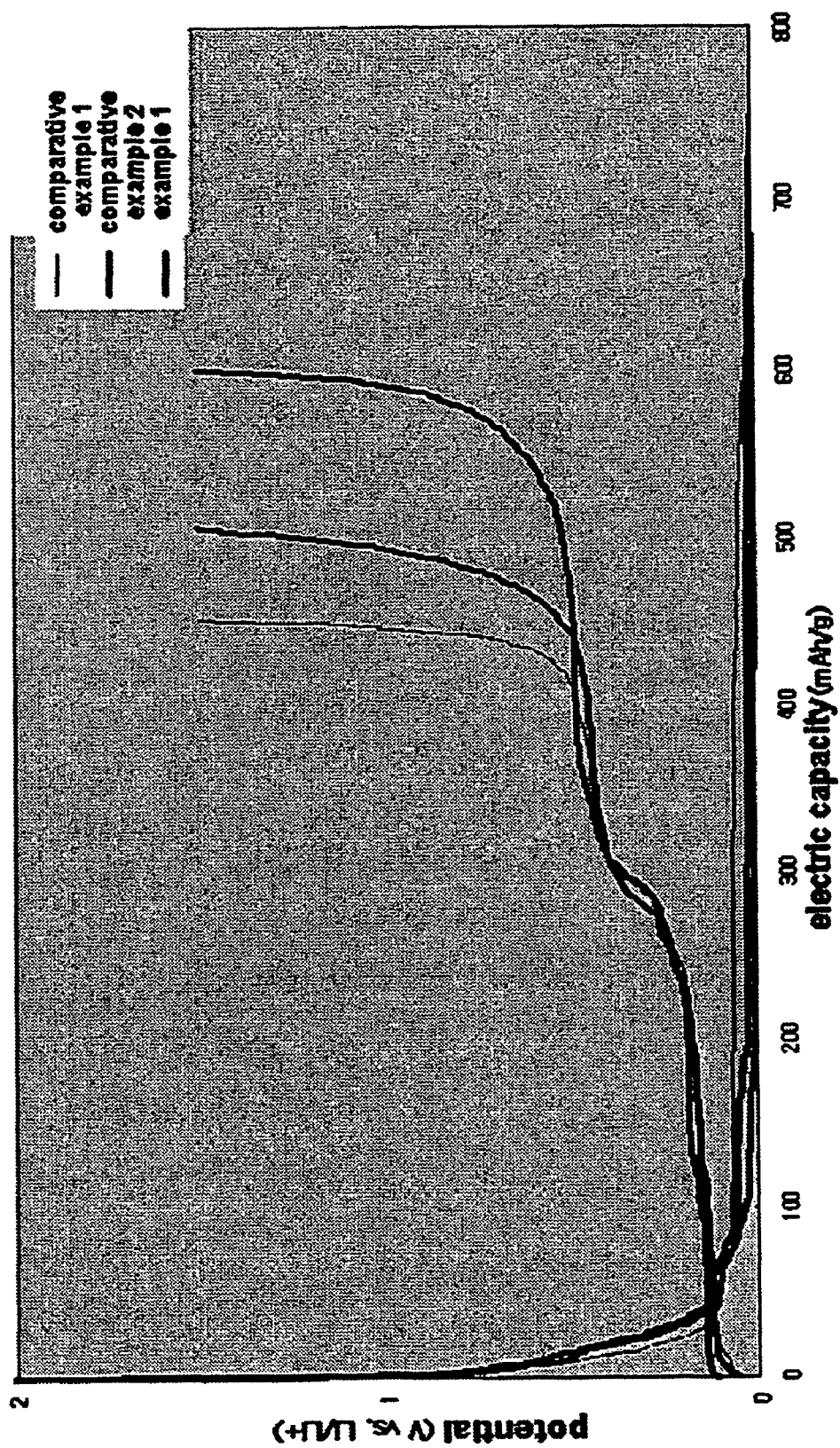
FIG. 1 is a graph of the charge/discharge characteristics of lithium batteries manufactured using anode active materials prepared according to Example 1 and Comparative Examples 1 and 2.

According to one embodiment of the present invention, an anode active material includes a coating layer containing a conductive metal material. Conventional anode active materials include metal cores coated only with carbonaceous materials, which have low electric capacity and conductivity. Therefore, these conventional anode active materials have restricted initial charge/discharge efficiencies and discharge capacities. In contrast, the anode active materials of the present invention, which contain conductive metal materials in the coating layer, have enhanced initial charge/discharge efficiencies and discharge capacities.

In one embodiment, the anode active material of the present invention includes a metal core and a coating layer formed on a surface of the metal core. The coating layer includes a conductive metal material.

The metal core may be made of a metal capable of lithium intercalation and deintercalation, i.e. a metal capable of forming a lithium alloy. Nonlimiting examples of suitable metals include silicon, aluminum, lead, tin, germanium, and the like. In one embodiment, silicon, silicon alloys, or silicon/graphite composites are used as the metal core. These cores enable sufficient charge/discharge cycles at high potential, can carry out reversible redox reactions with lithium during charge/discharge cycles, and have charge/discharge potentials similar to graphite particles.

The silicon alloys may be combinations of silicon with a metal selected from the group consisting of nickel, copper, cobalt, manganese, magnesium, aluminum, molybdenum, lead, tin, zinc, titanium and mixtures thereof.

The silicon/graphite composites may be composites obtained by high-energy mechanical milling of silicon with a material selected from the group consisting of graphite pieces, graphite fibers, fine graphite powders and mixtures thereof.

The coating layer, which includes the conductive metal material, serves to enhance the electric capacity of the metal core. The coating layer is present on at least a portion of a surface of the metal core. More specifically, the coating layer may be coated on the metal particles of the core. By so coating, the inner portion of the anode active material is isolated from the electrolyte solution.

The coating layer may have a multi-layer structure. For example, when the coating layer is made of carbon, the carbon coating layer may include a plurality of carbon coating films instead of a single carbon coating film.

The metal core of the anode active material may take various shapes, such as a single metal particle or a metal particle agglomerate. In one embodiment, the metal core is in the form of a single metal particle. However, since agglomeration of two or more metal particles may occur during the preparation of the anode active material, the metal core may also be a particle agglomerate, or the like.

In one embodiment, an anode active material is fabricated by coating a carbon coating layer including a conductive metal material on a surface of a metal core, which comprises a plurality of metal particles and a conductive metal material between the particles.

The coating layer may include a conductive metal material primarily present on surfaces of the metal core particles. Alternatively, the conductive metal material may be present within the coating layer as well as on surfaces of the metal core particles. In one embodiment, the conductive metal material is primarily present on surfaces of the metal core particles. In such an embodiment, the anode material, comprising graphite particles and a conductive metal material, has higher electric capacity. The conductive metal material may also be present in the metal core particles.

The coating layer may be formed uniformly over the entire surface of the metal core particles. However, even when the coating layer has thickness deviations or is formed only partially on surfaces of the metal core particles, enhanced initial charge/discharge efficiencies and discharge capacities can be obtained.

The average particle size of the metal core particles constituting the anode active material is not limited. However, in one embodiment, the conductive metal material may have an average particle size ranging from about 0.01 to about 1 μm. If the average particle size of the conductive metal material is less than about 0.01 μm, the material is difficult to handle properly during processing. On the other hand, if the average particle size of the conductive metal material exceeds about 1 μm, appropriate dispersion of the conductive metal material in the anode active material becomes difficult.

The conductive metal material may be present in the anode active material in an amount ranging from about 0.1 to 20 wt % based on the total weight of the anode active material. If the conductive metal material is present in an amount less than about 0.1 wt %, capacity, etc., will be insufficiently affected. On the other hand, if the conductive metal material is present in an amount exceeding about 20 wt %, the capacity per weight of the anode active material decreases.

The metal core of the anode active material undergoes a large volume change during lithium intercalation and deintercalation. Thus, the conductive metal material should have a low coefficient of elasticity to prevent separation from the metal core during the volume change and to withstand the volume change of the metal core. The conductive metal material should also have good conductivity to maintain electrical connection between particles and to enhance battery performance. To satisfy these requirements, the conductive metal material may be a metal or a metal alloy having a resistivity of $5.5 \times 10^{-8}$ Ω or less and a coefficient of elasticity of 200 GPa or less. In one embodiment, the conductive metal material is a metal or a metal alloy having a resistivity ranging from about $1.4 \times 10^{-8}$ Ωm to about $5.5 \times 10^{-8}$ Ωm and a coefficient of elasticity ranging from about 40 GPa to 200 GPa.

Nonlimiting examples of suitable conductive metal materials for use in the present invention include Cu, Ag, Al, Mg, Zn, Sn, alloys thereof and mixtures thereof.

The coating layer covering the conductive metal material may be a carbon layer made of a sintered polymeric material. Nonlimiting examples of suitable polymeric materials include vinyl resins, cellulose resins, phenol resins, pitch resins, tar resins and mixtures thereof. In one embodiment, polyvinyl alcohol is used.

The carbon layer covering the conductive metal material may be crystalline, having an interlayer spacing ($d_{002}$) of 3.45 Å or greater, or the conductive metal material may be amorphous. In one embodiment, the carbon layer covering the conductive metal material is crystalline having an interlayer spacing ($d_{002}$) ranging from about 3.45 Å to about 3.70 Å. In another embodiment, the conductive metal material is amorphous carbon.

When the carbon layer is highly crystalline, it may be graphite, allowing the carbon layer to react with the electrolyte solution on its surface. A lower crystalline or amorphous carbon layer does not react with electrolyte solutions during charge/discharge cycles, thereby preventing decomposition of the electrolyte solution and ensuring high charge/discharge efficiency.

The carbon layer may be compact in structure to prevent contact between the metal core particles and the electrolyte solution, thereby preventing a reaction from occurring between the electrolyte solution and the metal core particles/silicon particles. In this manner, the carbon layer serves as an anti-reaction layer to prevent reactions between the electrolyte solution and the anode materials, such as graphite particles.

In another embodiment of the present invention, an anode is manufactured using the above-described anode active material. The anode is manufactured by molding the anode material, which comprises the anode active material and a binder, into a predetermined shape. Alternatively, the anode is manufactured by coating the anode material on a current collector, such as copper foil.

In one embodiment, an anode material composition is first prepared and then directly coated on a current collector, such as copper foil.

Alternatively, the anode material composition is cast on a separate support to form an anode active material film, which is then removed from the support and laminated onto a current collector, such as copper foil, to form an anode plate. Although certain exemplary methods for manufacturing the anodes are described, it is understood that any suitable method for manufacturing the anode may be used.

Batteries require charging/discharging at large currents to ensure high capacity. Accordingly, battery electrodes should have low electric resistance. To reduce the resistance of electrodes, various conductive materials are generally added to the electrodes. For example, carbon black, graphite microparticles, etc. are used as such conductive materials.

Figure 4:
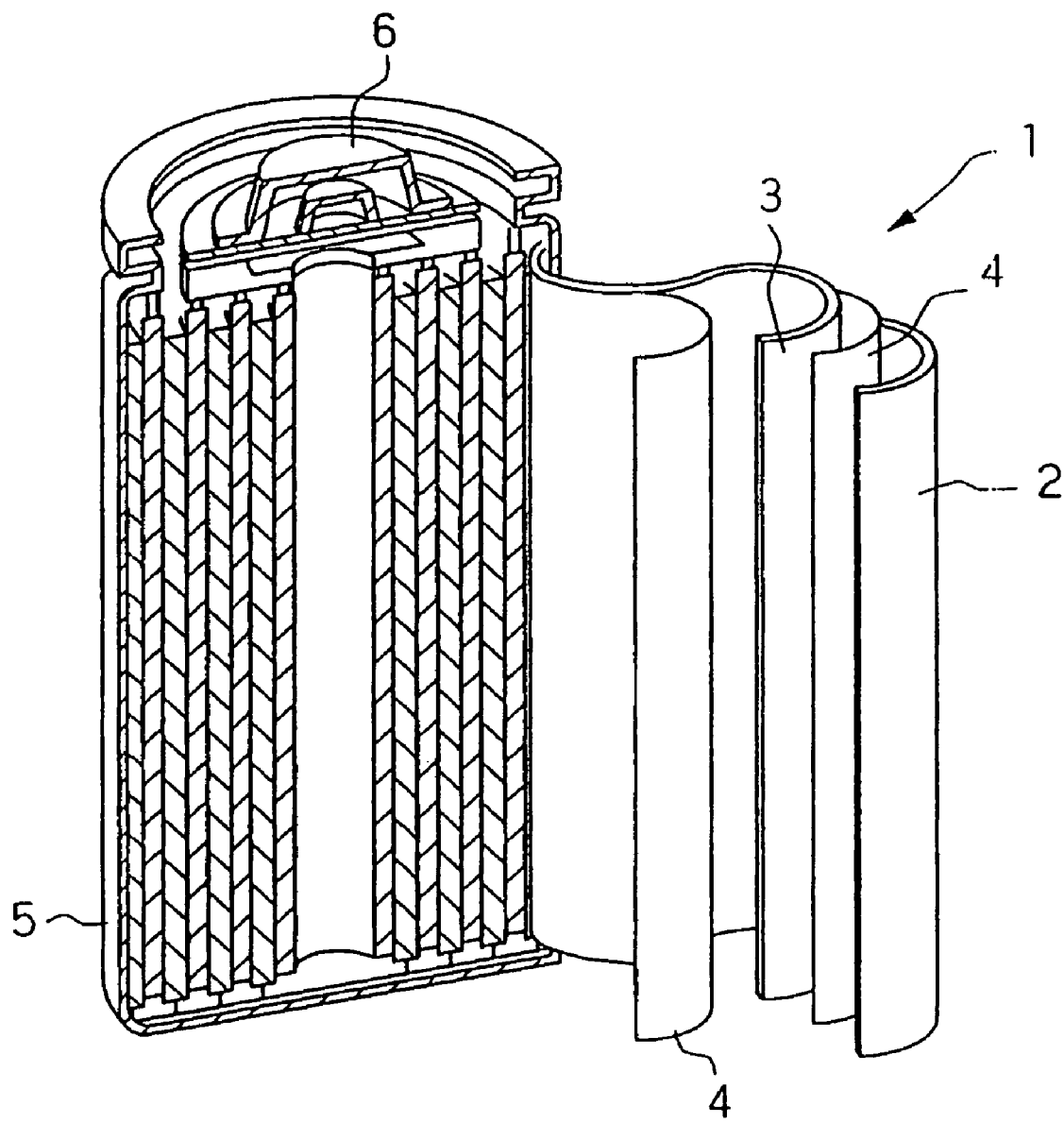

In another embodiment of the present invention, as shown in FIG. 4, a lithium battery 1 includes a cathode 3, the above-described anode 2 and a separator 4. The cathode 3, anode 2 and separator 4 are wound and then placed in a battery case 5. The battery case 5 is sealed with a cap assembly 6 and an electrolyte (not shown) is injected into the sealed battery case 5.

According to one embodiment of the present invention, the lithium battery is manufactured by first mixing a cathode active material, a conductive material, a binder, and a solvent to prepare a cathode active material composition. The cathode active material composition is then directly coated on a metal current collector and dried to prepare a cathode plate. Alternatively, the cathode active material composition is cast on a separate support to form a film which is then removed from the support and laminated on a metal current collector to prepare a cathode plate.

The cathode active material may be any lithium-containing metal oxide commonly known in the art. Nonlimiting examples of suitable lithium-containing metal oxides include $LiCoO_2$, $LiMn_xO_{2x}$, $LiNi_{1-x}Mn_xO_{2x}$ (x=1, 2), $Ni_{1-x-y}Co_xM-n_yO_2$ ($0 \leq x \leq 0.5$, $0 \leq y \leq 0.5$), and the like. More specifically, the cathode active material is a compound capable of inducing the oxidation and reduction of lithium. Nonlimiting examples of such compounds include $LiMn_2O_4$, $LiCoO_2$, $LiNiO_2$, $LiFeO_2$, $V_2O_5$, TiS and MoS.

One nonlimiting example of a suitable conductive material is carbon black.

Nonlimiting examples of suitable binders include vinylidenefluoride/hexafluoropropylene copolymers, polyvinylidenefluoride, polyacrylonitrile, polymethylmethacrylate, polytetrafluoroethylene, styrene butadiene rubber polymers and mixtures thereof.

Nonlimiting examples of suitable solvents include N-methylpyrrolidone, acetone, water, and the like.

The cathode active material, the conductive material, the binder, and the solvent are used in amounts commonly used in lithium batteries.

The lithium battery also includes a separator, and any separator commonly used in lithium batteries may be used. The separator should have low resistance to ion transfer of an electrolyte and good electrolyte impregnation properties. Nonlimiting examples of suitable materials for use as the separator include glass fibers, polyester, Teflon, polyethylene, polypropylene, polytetrafluoroethylene (PTFE) and mixtures thereof. The separator may comprise woven or non-woven fabrics. In lithium ion batteries, windable separators made of polyethylene or polypropylene may be used. In lithium ion polymer batteries, separators with good impregnation properties for organic electrolyte solutions may be used. These separators may be manufactured according to the following methods.

A polymer resin, a filler, and a solvent are mixed to prepare a separator composition. The separator composition is then directly coated on an electrode and dried to form a separator film. Alternatively, the separator composition is cast on a support and dried to form a separator film, which is then removed from the support and laminated on an electrode.

The polymer resin is not limited and may be any material that can be used as a binder for an electrode plate. Nonlimiting examples of suitable polymer resins include vinylidenefluoride/hexafluoropropylene copolymers, polyvinylidenefluoride, polyacrylonitrile, polymethylmethacrylate, and mixtures thereof.

The electrolyte solution is manufactured by dissolving a lithium salt in a solvent. Nonlimiting examples of suitable lithium salts for the electrolyte solution include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (x and y are each a natural number), LiCl, LiI and mixtures thereof. Nonlimiting examples of suitable solvents for the electrolyte solution include propylene carbonate, ethylene carbonate, diethyl carbonate, ethyl methyl carbonate, methyl propyl carbonate, butylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethylcarbonate, methylethylcarbonate, diethylcarbonate, methylpropylcarbonate, methylisopropylcarbonate, ethylpropylcarbonate, dipropylcarbonate, dibutylcarbonate, diethyleneglycol, dimethylether and mixtures thereof.

The separator 4 is positioned between the cathode plate 3 and the anode plate 2, and the separator 4, cathode plate 3 and anode plate 2 are wound or folded together to form an electrode assembly. The electrode assembly is encased in a cylindrical or square battery case, and an organic electrolyte solution is then injected into the battery case 5 to form a lithium ion battery.

The cell structures may be stacked to form a bi-cell structure, which is impregnated with an organic electrolyte solution. The resulting structure is sealed in a pouch to form a lithium ion polymer battery.

A method of preparing an anode active material for a lithium battery according to one embodiment of the present invention includes adding a polymeric material and a conductive metal material to a solvent to form a solution and stirring the solution. The method further includes adding metal particles to the solution and stirring and drying the resulting solution. The dried product is then sintered to form a coating layer.

The polymeric material may be sintered at a temperature ranging from about 500 to about 1,250° C. Carbonization of the polymeric material does not occur at sintering temperatures less than about 500° C. On the other hand, silicon is molten at sintering temperatures greater than about 1,250° C.

The conductive metal material may be a metal salt. If so, the conductive metal material comprises metal ions in solution, and the metal ions are dispersed over surfaces of the metal particles, or in the coating layer. When the counter ions are evaporated or changed during sintering, only the metal ions remain in the anode active material, enabling substantially uniform dispersion of the conductive metal material in the anode active material.

Nonlimiting examples of suitable metal salts for use in the conductive metal material include $SnCl_4$, $Ni(NO_3)_2$, $AgNO_3$, $Cu(NO_3)_2$, $Zn(NO_3)_2$, and the like. However, any compound suitable for use as the conductive metal material, as described above with respect to the preparation of the anode active material, may also be used.

Nonlimiting examples of polymeric materials suitable for use in the present invention include vinyl resins, cellulose resins, phenol resins, pitch resins, tar resins and mixtures thereof.

The coating layers of the present invention have good conductivity and prevent contact between the graphite and/or silicon particles and the electrolyte solution.

Figure 3:
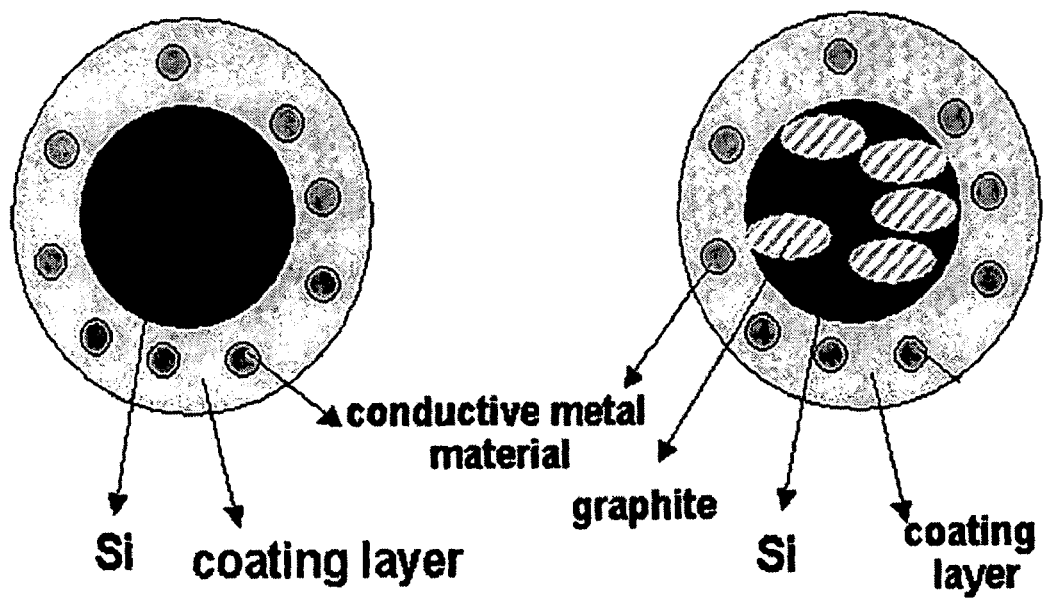
FIG. 3A is a schematic diagram of an anode active material according to one embodiment of the present invention.
FIG. 3B is a schematic diagram of an anode active material according to another embodiment of the present invention.

FIGS. 3A and 3B are schematic diagrams of anode active materials according to alternative embodiments of the present invention.

Hereinafter, the present invention will be described with reference to the following examples. However, it is understood that the following examples are provided for illustrative purposes only and are not intended to limit the scope of the invention.

Preparation of Anode Active Materials

EXAMPLE 1

An anode active material was prepared by first adding 0.7 g of silver nitride ($AgNO_3$) and 0.2 g of polyvinyl alcohol (PVA) having a molecular weight of 500 to 10 mL of distilled water and stirring the solution until the PVA dissolved. 3 g of silicon powder having an average particle size of less than 43 μm was then added to the solution. The solution was gradually heated while stirring until the water evaporated, yielding a solid comprising a mixture of silver nitride, PVA and silicon.

The solid mixture was heated under an argon atmosphere at 600° C. for 12 hours to completely carbonize the PVA. The carbonized product was then pulverized in a mortar, yielding a powder in which silicon particles were coated with a carbon layer containing the conductive metal material.

EXAMPLE 2

An anode active material was prepared as in Example 1, except that 0.5 g of silver nitride was used.

EXAMPLE 3

An anode active material was prepared as in Example 1, except that 0.3 g of silver nitride was used.

EXAMPLE 4

An anode active material was prepared as in Example 1, except that 1.4 g of silver nitride was used.

EXAMPLE 5

An anode active material was prepared as in Example 1, except that 1.1 g of tin tetrachloride ($SnCl_4$) was used instead of the silver nitride.

EXAMPLE 6

An anode active material was prepared as in Example 1, except that 1.2 g of nickel nitride ($Ni(NO_3)_2$) was used instead of the silver nitride.

EXAMPLE 7

An anode active material was prepared as in Example 1, except that 0.8 g of copper nitride ($Cu(NO_3)_2$) was used instead of the silver nitride.

EXAMPLE 8

An anode active material was prepared as in Example 1, except that 1.2 g of zinc nitride ($Zn(NO_3)_2$) was used instead of the silver nitride.

EXAMPLE 9

An anode active material was prepared by mixing 1 g of silicon powder having a primary average particle size of less than 0.5 μm and a secondary average particle size of less than 50 μm and 2 g of graphite powder with an average particle size of less than 20 mm in a mortar and mechanically milling the mixture for one hour to obtain a silicon/graphite composite powder. 0.2 g of silver nitride ($AgNO_3$) and 1 g of PVA having a molecular weight of 500 were then added to 20 mL of distilled water and stirred until the PVA dissolved. 1 g of the silicon/graphite composite powder was then added to the silver nitride/PVA solution. The resulting solution was gradually heated while stirring until the water evaporated, yielding a solid comprising a mixture of silver nitride, PVA and silicon/graphite powder.

The solid mixture was then heated under an argon atmosphere at 900° C. for 3 hours to carbonize the PVA. The carbonized product was then pulverized in a mortar, yielding a powder in which silicon/graphite composite particles were coated with a carbon layer containing the conductive metal material.

COMPARATIVE EXAMPLE 1

An anode active material was prepared by providing a silicon powder having an average particle size of less than 43 mm.

COMPARATIVE EXAMPLE 2

An anode active material was prepared by adding 0.2 g of PVA having a molecular weight of 500 to 10 mL of distilled water and stirring the resulting solution until the PVA dissolved. 3 g of silicon powder having an average particle size of less than 43 μm was then added to the solution. The solution was gradually heated while stirring until the water evaporated, yielding solid comprising a mixture of PVA and silicon.

The solid mixture was heated under an argon atmosphere at 600° C. for 12 hours to carbonize the PVA. The carbonized product was then pulverized in a mortar, yielding a powder in which silicon particles were coated with a carbon layer.

COMPARATIVE EXAMPLE 3

An anode active material was prepared by mixing 1 g of silicon powder having a primary average particle size of less than 0.5 μm and a secondary average particle size of less than 50 μm and 2 g of graphite powder having an average particle size of less than 20 mm in a mortar and mechanically milling the mixture for one hour to obtain a silicon/graphite composite powder.

COMPARATIVE EXAMPLE 4

An anode active material was prepared by adding 0.1 g of PVA having a molecular weight of 500 to 10 mL of distilled water and stirring the solution until the PVA dissolved. 1 g of the silicon/graphite composite powder of Comparative Example 3 was then added to the solution. The solution was then gradually heated while stirring until the water evaporated, yielding a solid mixture comprising PVA and silicon/graphite composite.

The solid mixture was heated under an argon atmosphere at 900° C. for 3 hours to carbonize the PVA. The carbonized product was then pulverized in a mortar, yielding a powder in which silicon particles were coated with a carbon layer.

COMPARATIVE EXAMPLE 5

An anode active material was prepared by adding 0.29 of PVA having a molecular weight of 500 to 10 mL of distilled water and stirring the solution until the PVA dissolved. 1 g of the silicon/graphite composite powder of Comparative Example 3 was then added to the solution. The resulting solution was gradually heated while stirring until the water evaporated, yielding a solid mixture comprising PVA and silicon/graphite composite.

The solid mixture was heated under an argon atmosphere at 900° C. for 3 hours to carbonize the PVA. The carbonized product was pulverized in a mortar, yielding a powder in which silicon particles were coated with a carbon layer.

COMPARATIVE EXAMPLE 6

An anode active material was prepared by mixing 0.2333 g of silicon powder having a primary average particle size of less than 0.5 μm and a secondary average particle size of less than 50 mm and graphite powder having an average particle size of less than 20 μm in a mortar to obtain a silicon/graphite composite powder.

Manufacturing of Anodes

Anodes were prepared by mixing 0.3 g of the active material powders prepared in each of Examples 1-8 and Comparative Examples 1-2 with 2.4 g of graphite powder having an average particle size of 20 μm, 0.6 g of graphite powder having an average particle size of 2 μm, 0.06 g of styrene butadiene rubber (SBR) and 0.06 g of carboxymethyl cellulose (CMC). 5 mL of distilled water was added to the mixture. The mixture was stirred for three hours using a mechanical stirrer to make a first slurry.

The first slurry was coated to a thickness of about 200 μm on a copper (Cu) current collector with a doctor blade and then dried. The resulting structure was dried under vacuum at 110° C. to form an anode plate.

0.7 g of the active material powder prepared according to each of Example 9 and Comparative Examples 3-6 was mixed with 0.2 g of graphite powder having an average particle size of 6 μm, 0.1 g of polyvinylidene fluoride (PVDF, KF1100, Kureha Chemical Industry Corporation, Japan) as a binder, and N-methylpyrrolidone (NMP) as a solvent to form a second slurry.

The second slurry was coated to a thickness of about 100 μm on a copper (Cu) current collector with a doctor blade and then dried. The resulting structure was dried under vacuum at 130° C. to form an anode plate.

Manufacturing of Lithium Batteries 2015 standard coin cells were manufactured using the anode plates prepared with the anode active materials of Examples 1-9 and Comparative Examples 1-6. The coin cells also included counter electrodes made of lithium metal, PTFE separators, and electrolyte solutions comprising 1 M LiPF$_6$ in a 3:7 mixed EC (ethylene carbonate)+DEC (diethyl carbonate) solvent.

Charge/discharge Experiments

The coin cells manufactured using the anode active materials of Examples 1-8 and Comparative Examples 1-2 were charged under a constant charging current of 50 mA per 1 g of active material until the cell voltage against a Li electrode measured 0.001 V. The cells were then charged under a constant charging voltage of 0.001 V until the current of the cell reduced to 5 mA per 1 g of active material.

The fully charged cells were allowed to stand for about 30 minutes and then discharged under a constant discharging current of 50 mA per 1 g of active material until the voltage of the cell measured 1.5 V. The results of these experiments are shown in Table 1 below and in FIG. 1. As used herein, the term "silicon discharge capacity" indicates discharge capacity of Li at a voltage of 0.25 V or more.

The coin cells manufactured using the anode active materials of Example 9 and Comparative Examples 3-6 were charged under a constant charging current of 100 mA per 1 g of active material until the cell voltage against a Li electrode measured 0.001 V.

The fully charged cells were allowed to stand for about 30 minutes and then discharged under a constant discharging current of 100 mA per 1 g of active material until the voltage of the cell measured 1.5 V. The results for these experiments are shown in Table 2 below.

TABLE 1

|  | Charge capacity (mAh/g) | Discharge capacity (mAh/g) | Initial efficiency (mAh/g) |
|---|---|---|---|
| Example 1 | 672.3 | 600.1 | 89.2 |
| Example 2 | 672.9 | 594.4 | 88.6 |
| Example 3 | 673.1 | 590.7 | 87.2 |
| Example 4 | 668.2 | 565.2 | 84.5 |
| Example 5 | 670.3 | 481.7 | 71.8 |
| Example 6 | 644.3 | 468.9 | 72.7 |
| Example 7 | 655.5 | 524.6 | 80.0 |
| Example 8 | 652.3 | 489.7 | 75.1 |
| Comparative Example 1 | 750.0 | 451.8 | 60.2 |
| Comparative Example 2 | 680.1 | 506.2 | 74.4 |

As shown in Table 1 and FIG. 1, the lithium batteries manufactured using the conductive metal materials according to Examples 1-8 exhibited remarkably enhanced discharge capacity and initial charge/discharge efficiency as compared to the lithium battery manufactured using only the silicon metal core according to Comparative Example 1. Also, as compared to the lithium battery manufactured using the metal core coated with only a carbonaceous material according to Comparative Example 2, the lithium batteries manufactured according to Examples 1-4, 7 and 8 (using silver, copper, and zinc having high conductivity and low coefficients of elasticity as the conductive materials) exhibited enhanced discharge capacity and initial charge/discharge efficiency. The lithium batteries manufactured using tin and nickel as the conductive material (Examples 5 and 6) exhibited characteristics comparable to those of the lithium battery manufactured with a metal core coated with only a carbonaceous material (Comparative Example 2). This can be attributed to the presence of a conductive metal material, which has good conductivity and a low coefficient of elasticity. The conductive metal material facilitates electron and ion transfer, and alleviates volume changes in the metal cores, making reversible intercalation and deintercalation of lithium easier.

TABLE 2

|  | Charge capacity (mAh/g) | Discharge capacity (mAh/g) | Initial efficiency (%) | Charge/discharge capacity retention (50 cycles)(%) |
|---|---|---|---|---|
| Example 9 | 1050 | 1325 | 79.2 | 80.5 |
| Comparative Example 3 | 1010 | 1425 | 70.8 | 52.3 |
| Comparative Example 4 | 901 | 1115 | 80.8 | 70.9 |
| Comparative Example 5 | 822 | 1017 | 80.8 | 75.8 |
| Comparative Example 6 | 861 | 1078 | 79.8 | 21 |

Figure 2A:
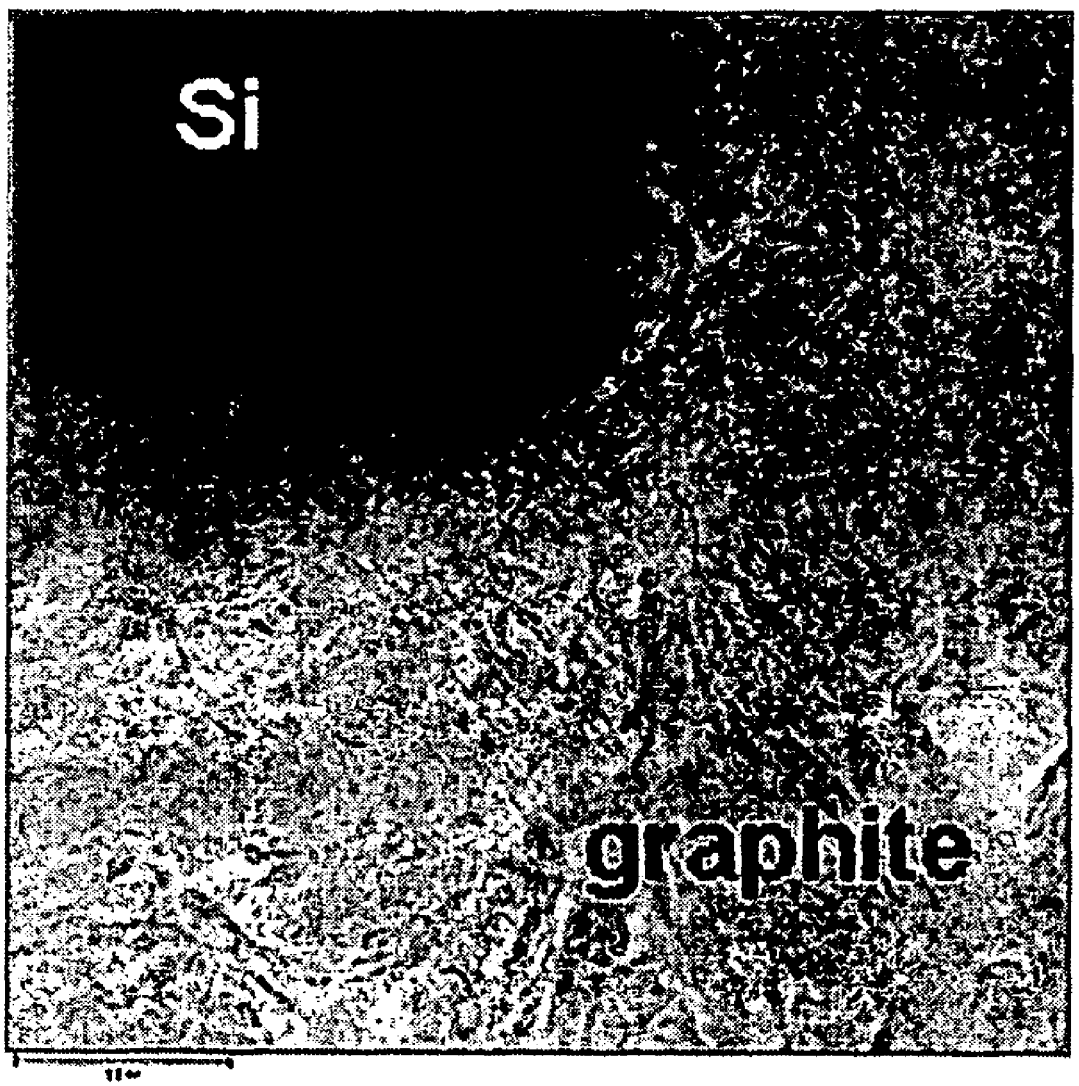
FIG. 2A is a transmission electron microscope (TEM) image of an anode active material prepared according to Comparative Example 3.
Figure 2B:
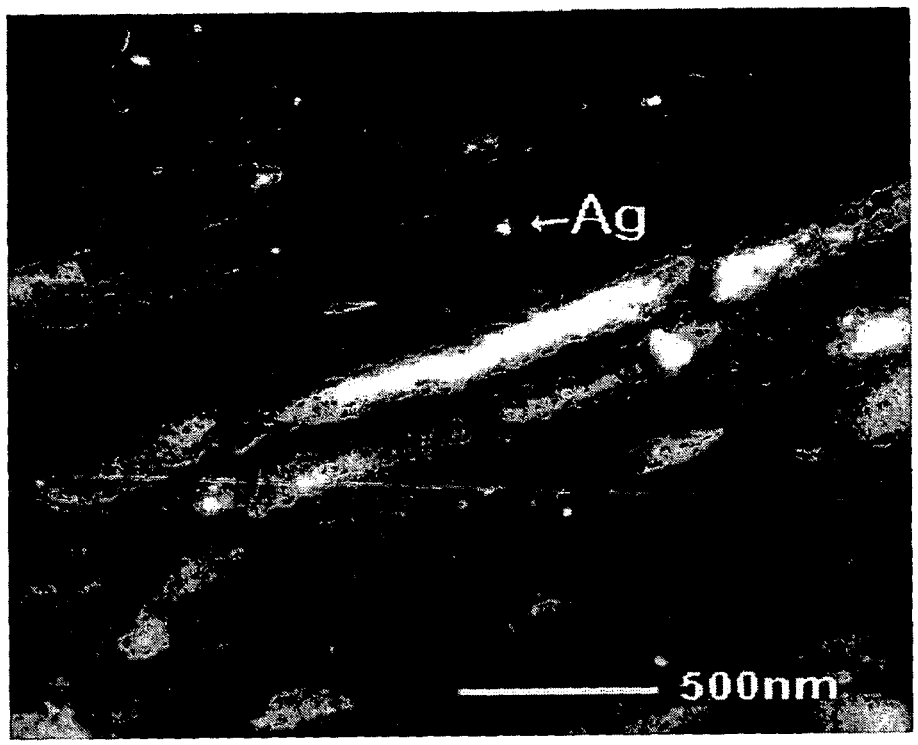
FIG. 2B is a TEM image of an anode active material prepared according to Example 9.

FIG. 2A is a transmission electron microscope (TEM) image of the silicon/graphite composite powder of Comparative Example 3, and FIG. 2B is a TEM image of the silicon/graphite composite powder including the conductive metal material of Example 9. The conductive metal material microparticles were distributed within the silicon/graphite composite powder and the conductive metal material in the powder shown in FIG. 2B, unlike the powder shown in FIG. 2A.

As shown in Table 2, the lithium battery manufactured using both the silicon/graphite composite core and the conductive metal material (Example 9) exhibited higher capacity and capacity retention characteristics as compared to the lithium battery manufactured using the silicon/graphite composite according to Comparative Example 3 and the lithium battery manufactured using the silicon/graphite composite according to Comparative Example 6. The lithium battery according to Example 9 also exhibited an equivalent initial efficiency, higher capacity, and better charge/discharge capacity retention as compared to the lithium batteries manufactured using the silicon/graphite composite powders coated with only carbonaceous materials according to Comparative Examples 4 and 5. As described above, this can be attributed to the presence of a conductive metal material which has good conductivity and a low coefficient of elasticity. The conductive metal material facilitates electron and ion transfer, and alleviates volume changes in the metal cores, making reversible intercalation and deintercalation of lithium easier.

According to one embodiment of an anode active material of the present invention, a carbon-based coating layer covers a metal core and includes a conductive metal material with good electron conductivity and elasticity. The anode active material exhibits enhanced charge/discharge capacity and reduced stress caused by expansion of the carbon-based coating layer and the metal core during charge/discharge cycles. Furthermore, direct contact between the metal core and the electrolyte solution is remarkably reduced. In addition, anodes including the active material and lithium batteries including the anodes have excellent charge/discharge characteristics, such as discharge capacity and initial charge/discharge efficiency.

While the present invention has been described with reference to certain exemplary embodiments, it will be understood by those of ordinary skill in the art that various changes in form and details may be made without departing from the spirit and scope of the present invention as defined by the following claims.

What is claimed is:

1. An anode active material comprising:
    a metal core comprising at least one metal core particle; and
    a carbon coating layer formed on at least a portion of a surface of the metal core particle, the carbon coating layer comprising a carbonaceous material and a conductive metal material embedded in the carbonaceous material and the conductive metal material is spaced apart from the metal core particle, the conductive metal material comprising a metal other than a metal of the metal core particle, wherein the conductive metal material is selected from the group consisting of Cu, Ag, Al, Mg, Zn, Sn, and mixtures thereof.

2. The anode active material of claim 1, wherein the conductive metal material of the carbon coating layer is present on substantially the entire surface of the metal core particle.

3. The anode active material of claim 1, wherein the conductive metal material is present in the anode active material in an amount ranging from about 0.1 to about 20 wt% based on the total weight of the anode active material.

4. The anode active material of claim 1, wherein the conductive metal material is selected from the group consisting of metals and metal alloys having resistivities of $5.5 \times 10^{-8}$ $\Omega$m or less and coefficients of elasticity of 200 GPa or less.

5. The anode active material of claim 4, wherein the conductive metal material has a resistivity ranging from about $1.4 \times 10^{-8}$ $\Omega$m to $5.5 \times 10^{-8}$ $\Omega$m and a coefficient of elasticity ranging from about 40 GPa to 200 GPa.

6. The anode active material of claim 1, wherein the carbonaceous material is selected from the group consisting of crystalline carbon having an interlayer spacing ($d_{002}$) of about 3.45 Å or greater, and amorphous carbon.

7. The anode active material of claim 1, wherein the carbonaceous material is selected from the group consisting of crystalline carbon having an interlayer spacing ($d_{002}$) ranging from about 3.45 Å to about 3.45 Å, and amorphous carbon.

8. The anode active material of claim 1, wherein the metal core comprises a material selected from the group consisting of silicon, aluminum, lead, tin, germanium, silicon alloys, and silicon/graphite composites.

9. An anode comprising the anode active material of claim 1.

10. A lithium battery comprising the anode of claim 9.

11. An anode comprising:
    a negative active material comprising:
        a metal core comprising at least one metal core particle; and
        a carbon coating layer formed on at least a portion of a surface of the metal core particle, the carbon coating layer comprising a carbonaceous material and a conductive metal material, embedded in the carbonaceous material and the conductive metal material is spaced apart from the metal core particle, the conductive metal material comprising a metal other than a metal of the metal core particle, wherein the conductive metal material is selected from the group consisting of Cu, Ag, Al, Mg, Zn, Sn, and mixtures thereof;
    a binder;
    and a current collector.

* * * * *